United States Patent [19]
Larson et al.

[11] Patent Number: 5,784,999
[45] Date of Patent: Jul. 28, 1998

[54] ANIMAL FEEDING NIPPLE

[75] Inventors: Leigh R. Larson, Johnson Creek; Reed A. Larson, Watertown, both of Wis.

[73] Assignees: Merrick's, Inc., Middleton; Hi-Life Rubber, Inc., Johnson Creek, both of Wis.

[21] Appl. No.: 571,346

[22] Filed: Dec. 12, 1995

Related U.S. Application Data

[63] Continuation-in-part of Ser. No. 187,445, Jan. 25, 1994, Pat. No. 5,474,028.
[51] Int. Cl.⁶ ............................................ A01K 9/00
[52] U.S. Cl. ............................. 119/71; 215/11.5
[58] Field of Search ................. 119/71; 215/11.4, 215/11.5

[56] References Cited

U.S. PATENT DOCUMENTS

| Re. 11,086 | 6/1890 | Eggers | 215/11.5 |
| 3,593,870 | 7/1971 | Anderson | 215/11.5 |
| 4,993,568 | 2/1991 | Morifuji et al. | 215/11.5 X |
| 5,474,028 | 12/1995 | Larson et al. | 119/71 |

FOREIGN PATENT DOCUMENTS

| 2250017 | 5/1992 | United Kingdom | 215/11.5 |

*Primary Examiner*—Robert P. Swiatek
*Attorney, Agent, or Firm*—Reinhart, Boerner, Van Deuren, Norris & Rieselbach, S.C.

[57] ABSTRACT

A nipple/cover integral with a vented control member and/or check valve, as can be used in combination with a container for controlled movement of fluid, such as provided during liquid feeding of infant mammals.

11 Claims, 4 Drawing Sheets

ANIMAL FEEDING NIPPLE

This application is a continuation-in-part of Ser. No. 08/187,445, filed Jan. 25, 1994, now U.S. Pat. No. 5,474,028.

TECHNICAL FIELD

This invention relates to a nipple or, similarly, an orifice through which the movement of a fluid can be regulated and an apparatus for such regulation for fluids such as milk or milk replacer, to domesticated mammals, particularly young mammals such as calves, piglets, lambs, foals, puppies, kittens, or the like.

BACKGROUND OF THE INVENTION

A conventional animal feeding nipple for feeding liquids, such as milk or milk replacer, to domesticated mammals is formed out of a flexible, elastomeric or resilient material, such as natural or synthetic rubber or flexible plastic. The conventional nipple will comprise a nipple tube, on which the mammal will suckle to withdraw liquid, connected to a means for attaching the nipple tube to a liquid-feed receptacle or container. See, for example, U.S. Pat. Nos. 2,628,59, 2,699,778 and 3,042,002.

The conventional nipple may be attached, via the attachment means, to a liquid-feed receptacle or container, such as a closed plastic or glass bottle, carboy, barrel, pail, or the like, in which the liquid feed is sealed from atmospheric pressure and from which the liquid feed can flow into the inside of the nipple tube. Typically the nipple will be attached to the closed liquid-feed receptacle or container at a position such that the liquid feed will flow under the influence of gravity into the inside of the nipple tube.

The conventional nipple comprises proximate the distal end (i.e., the end furthest from the receptacle) of the nipple tube a self-sealing orifice or aperture. In response to sucking by a mammal on the nipple tube during suckling, this aperture opens and allows liquid to flow into the mammal's mouth. Then, when the mammal, during the suckling cycle, discontinues sucking on the nipple tube, the aperture spontaneously seals and stops the flow of liquid.

Conventionally, before a mammal begins to remove liquid feed from a closed receptacle (e.g., a plastic bottle) through a nipple, where the inside of the receptacle and nipple is substantially sealed from atmospheric pressure, the liquid inside the receptacle and nipple will be at or close to atmospheric pressure. When liquid is removed from the closed receptacle through the nipple, by sucking by the mammal on the nipple tube, the pressure inside the nipple and the receptacle is reduced and, consequently, a pressure differential is created between the inside and outside of the receptacle and nipple. The pressure outside will typically be the local atmospheric pressure.

This pressure differential is a problem that impairs the efficiency of feeding liquids to domesticated mammals, especially milk or milk replacers to young mammals. The pressure differential causes low flow of liquid feed to the animal and may cause collapse or breakage of the liquid-feed receptacle.

Prior art nipples have a vent through the wall of the nipple, at a position which is not blocked from exposure to the atmosphere when the mammal is suckling on the nipple tube. The vent is present to overcome the problem of the pressure differential that is created during sucking of liquid out of the receptacle through the nipple. This vent may be located for example on a transverse portion of the nipple that joins the proximal end of the nipple tube (the end closest to the receptacle when the nipple is attached to a liquid-feed receptacle) to the means for attaching the nipple to the liquid-feed receptacle. During and after suckling, air is drawn into the nipple and feed receptacle through this vent to reduce and eventually eliminate this pressure differential. The vent in prior art nipples is simply a hole that traverses the wall of the nipple from the outside (the side exposed to the atmosphere) to the inside. The hole has the shape of a cylinder or a truncated cone, with the narrower cross-section of the cone at the inside surface of the nipple.

The vents in prior art nipples do not restrict flow of air or liquid to one direction, i.e., from outside to inside the nipple. A prior art vent with a cross-sectional area at the inside wall of the nipple that is large enough to be useful in relieving the pressure differential developed during suckling invariably allows leakage of liquid feed. Consequently, animal feeding nipples of the prior art that are effective in solving the problem of the pressure differential, discussed above, disadvantageously allow leakage of liquid feed out from the nipple-receptacle combination.

The present invention is directed to avoiding this problem of liquid feed leakage from vents present in prior art animal feeding nipples to relieve pressure differentials between the inside and outside of the nipples caused by suckling.

SUMMARY OF THE INVENTION

The present invention provides an improved nipple and/or control member for use in combination therewith for movement of a fluid from a container in which together with the attached nipple or a cover, the fluid is sealed from atmospheric pressure unless a negative pressure, such as that from a mammal sucking on the nipple or orifice, is applied to the nipple or orifice sucking on the nipple tube. The nipple and/or control member of the invention comprises a check valve which opens unidirectionally to allow air to flow from outside to inside the container to substantially eliminate pressure differentials due to the application of negative pressure. Because the check valve opens unidirectionally, fluid does not leak out of the nipple or orifice when the valve is open to allow pressure equalization. Accordingly, it can also be an object of this invention to provide a cover, for use in combination with a container, having an orifice, protuberance or a small projection for movement of a fluid therethrough, such movement regulated with a control member to equalize the pressure differential across the cover upon application of a negative pressure to the orifice, projection or protuberance.

It will be understood by those skilled in the art that one or more aspects of this invention can meet certain objectives, while one or more other aspects can meet certain other objectives. Each objective may not apply to the same degree, in all instances, to every aspect of the present invention. As such, these objects can be viewed in the alternative with respect to any one aspect of the present invention.

Other objects, features and advantages of the present invention will be apparent from this summary and the included descriptions, and will be readily apparent to those skilled in the art having knowledge of fluid movement as controlled or regulated through pressure equalization and, in particular, the feeding of liquids to domesticated mammals. Such object, features, benefits and advantages will be apparent from the above as taken in conjunction with the accompanying description, figures and all reasonable inferences to be drawn therefrom.

DETAILED DESCRIPTION OF THE INVENTION

Figure 1:
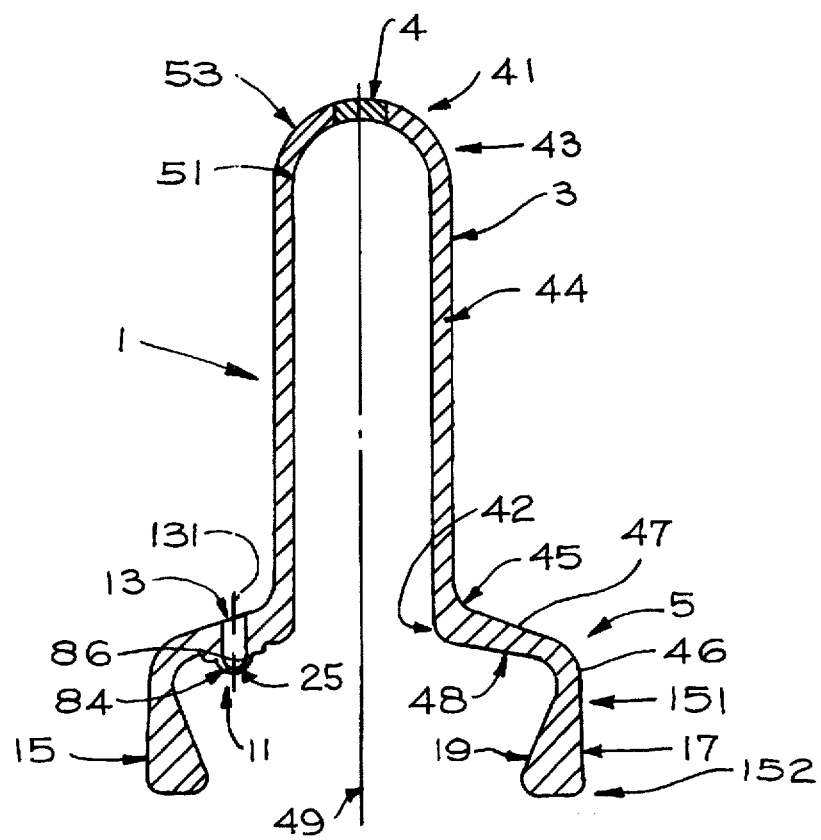
FIG. 1 is a side view, in a longitudinal section, of an animal nipple for feeding animals, in accordance with this invention.

The invention includes an improved nipple, cover and/or vented control member for use therewith in fluid movement, in particular for feeding liquids to domesticated mammals. The invention is especially useful when the liquid needs to be drawn by suckling by the mammal from a container, such as a bottle, the inside of which, together with the inside of the attached cover or nipple, is not in communication with the atmosphere such that the pressure inside the sealed container drops as a negative pressure is applied when the mammal suckles liquid out.

In accordance therewith, the invention includes a nipple for feeding liquids to a domesticated mammal, said nipple comprising an elastic molded body comprising:

a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal;

a traverse wall having an inner perimeter and an outer perimeter, said inner perimeter being joined contiguously over its entire length to the proximate end of the nipple tube and said outer perimeter being separated from said inner perimeter and more distant from the proximate end of the nipple tube than said inner perimeter, and having an external face and an internal face, said external face being on the side of the nipple not exposed to liquid feed and said internal face being on the side of the nipple exposed to liquid feed when the nipple is used;

a vent located between the inner perimeter and the outer perimeter of the traverse wall and extending from the external face to the internal face of the traverse wall; and a means for attaching said nipple to a container for liquid feed for the mammal, the improvement which comprises a check valve at the end of the vent at the internal face of the traverse wall, said check valve having a cap which protrudes inwardly into the space inside the nipple, has an inside wall which faces the vent and an outside wall which faces inwardly into the inside of the nipple, and has a slit that extends from the inside wall to the outside wall of the cap. Pressure inside and outside of the nipple is equalized during withdrawal of liquid from the nipple by suckling of the mammal while preventing leakage of liquid out of the nipple.

The improved nipple of the invention is made of any flexible or resilient material, such as natural or synthetic rubber or various flexible plastics or other polymeric materials, which are not harmful for domesticated mammals to suckle. Natural rubber is preferred. The process of making the improved nipple is by conventional injection or transfer molding. It is preferred that the nipples of the invention be molded as a single piece. Slits where called for may also be cut or stamped into the nipple by conventional processes.

Alternatively, the distal end of the nipple tube has a first cap which includes a self-sealing aperture, and the wall of the nipple tube can include such a first cap and a tube which extends from the first cap to the proximate end of the nipple tube. When the nipple tube is unflexed, it is substantially cylindrically disposed about a first axis. Likewise, preferably, the self-sealing aperture of the first cap is a slit extending through the wall of the nipple tube.

In accordance with this invention, a member for attaching the nipple and/or cover to a container for a fluid can include a side wall having a top, a bottom, an outer face extending from the top to the bottom, and an inner face extending from the top to the bottom, such that the top of the outer face of the side wall is contiguously joined to the outer circumference of the external face of the traverse wall, and the top of the inner face of the side wall is contiguously joined to the outer circumference of the internal face of the traverse wall. In preferred embodiments of this invention, the inner face of such a side wall can have an inward pitch, such that the attachment member can engage and seal a container through frictional engagement. Alternatively, in preferred embodiments, the inner face of the side wall is arranged and configured for threaded engagement with a container. Where the nipple and/or cover of this invention is present without such a side wall, a traverse wall or a similarly situated upward surface can be used for attachment to a container by means of a clamp or with an overlaid rim in threaded engagement with the container.

Without limiting the scope of the present invention, the improvements described herein can further include an intervention member circumferentially spaced about the check valve to protect the check valve from contact with the container. In preferred embodiments, the intervention member is at least one protrusion from the internal face of the traverse wall. In highly preferred embodiments, the intervention member is a pair of protective beads diametrically opposed across the check valve. It should also be understood that, in accordance with this invention, the intervention members so described can be arranged and configured in a way to protect the check valve from contact with the container. Such arrangements and configurations include, without limitation, various rims, beads, bumpers, walls, nobs and the like, so long as such intervention members do not impede and/or interfere with the function of the check valve or the sealing engagement of the nipple and/or cover with the container.

The present invention also includes, in combination with a cover sealingly engaging a container, the cover having an orifice, protuberance or projection for application of negative pressure thereto to control movement of a fluid from the container, a member for unidirectional flow of air into the container responsive to application of such negative pressure, the member including a vent through the cover and terminating internally with a check valve integral to the cover and having a cap which protrudes inwardly into the space inside the container, an inside wall which faces the vent and an outside wall which faces inwardly into the inside of the container, and a slit configuration extending from the inside wall to the outside wall of the cap.

In preferred embodiments, this combination further includes an intervention member circumferentially spaced about the check valve to protect the check valve from contact with the container. In highly preferred embodiments, the intervention member is at least one protrusion adjacent to the check valve and protruding inwardly into the space inside the container. In highly preferred embodiments, the intervention member is a pair of protective beads diametrically opposed across the check valve. As with other various embodiments of this invention, the arrangement and configuration of the intervention member is limited only in such a way that there is no interruption of or interference with the function of the vented control member and/or check valve thereof. Likewise, in highly preferred embodiments, the combination of this invention includes check valves and slits which are dimensioned and configured to open in response to a minimum negative pressure applied to the orifice, protuberance or projection, such that the pressure differential across the cover is equalized. Such dimensions and configurations will be well-known to those skilled in the art, made aware of this invention knowledgeable with respect to the particular pressure parameters to be applied to a particular nipple and/or cover.

With reference to the drawings, the animal nipple has a nipple tube 3 which has a length and wall thickness dimensioned and configured suitable for the mammal which is intended to use the nipple. The preferred nipple illustrated in FIG. 1 has dimensions suitable for a bovine calf. Those of skill will readily understand how to adjust dimensions from those indicated in FIG. 1 to make a nipple suitable for other domesticated mammals.

Figure 1A:
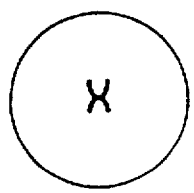
FIGS. 1A, 1B, 1C and 1D show a top view illustrating alternative variants for the check valve slit 2 as shown in FIG. 2, in accordance with this invention.
Figure 1B:
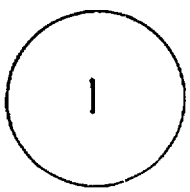
Figure 1C:
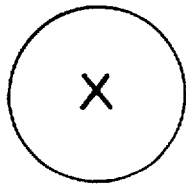
Figure 1D:
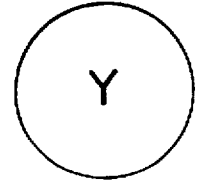
Figure 5:
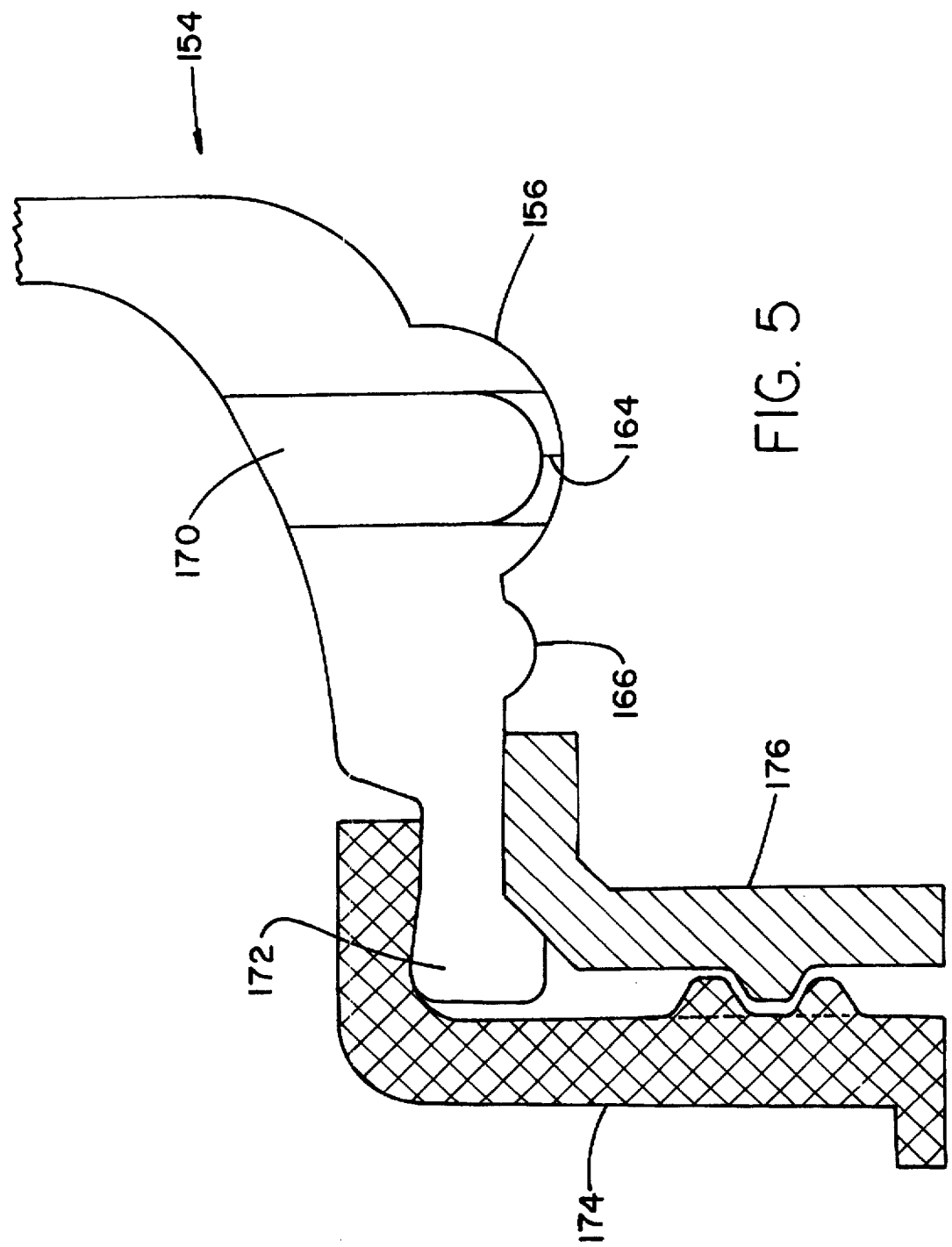
FIG. 5 is a partial cross-sectional view of a cover and vented pressure control member, with check valve, shown in combination with a container threadedly engaged with an attachment member to seal the cover to the container.

In the nipple 1, the nipple tube 3 has a distal end 41 and a proximate end 42, a wall 44, a self-sealing aperture 4, which may be a slit cut through the wall and having a shape like those illustrated in FIGS. 1A–1D. Likewise, the slit or opening is dimensioned and configured for response to the desired application of negative pressure, as will be understood by those skilled in the art. A slit in the shape of a "stylized X" is illustrated in FIG. 1A. In a preferred embodiment, the nipple tube 3 will be substantially cylindrical about an axis 49 (i.e., as nearly as possible cylindrical given tolerances of molds and materials used in construction of the nipple) and will have a cap 43 at the distal end, which cap will include the self-sealing aperture 4. The liquid leaves the nipple/cover and enters the mammal through the self-sealing aperture 4 as the mammal suckles the tube. The nipple 1 also includes a traverse wall 5, which has an inner perimeter 45 and an outer perimeter 46 and an outer face 47 and an inner face 48. The nipple has a vent 13, which is preferably an opening which is substantially cylindrical about an axis 131. There is also a member for attaching the nipple and/or cover to a container, such as a plastic bottle, holding the fluid to be moved or fed to the mammal. This member is preferably a side wall 15, which has a top 151, a bottom 152, an outer face 17 and an inner face 19. The side wall inner face 19 has an appropriate mechanism for holding the nipple or cover to the container. Thus, the inner face may have a pitch, as illustrated in FIG. 1, or threads to twist on to a bottle. Alternatively, the attachment member can be a clamp to the container or an overlaid rim in threaded engagement with the container, as shown in FIG. 5.

Figure 3:
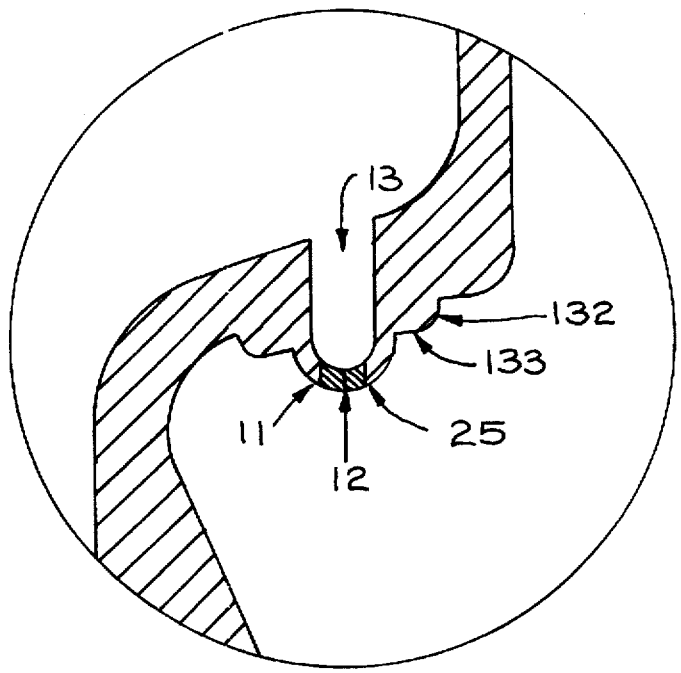
FIG. 3 is an enlarged detail portion of the animal nipple illustrated in FIG. 1 showing the check valve.

The invention includes a check valve 11 at the inner end of the vent 13. The check valve equalizes pressure inside and outside of the nipple/cover during withdrawal of liquid while preventing leakage of liquid out of the nipple orifice and/or cover projection. One preferred means to accomplish this is illustrated in FIG. 3. This preferred means entails an annulus 132 which surrounds the vent hole and a top face 133 positioned inwardly from the innerface of the traverse wall and capped by a second cap 25 which projects inwardly and blocks the vent and has a small slit 12 which is cut through the cap. The slit may have shapes such as those illustrated in FIGS. 1A–1D, including possibly a stylized X shape. The slit opens in order to allow air to flow unidirectionally through the check valve 11 into the feeder receptacle to equalize a pressure differential upon application of negative pressure such as that created by a mammal withdrawing a fluid/liquid feed from the container. The check valve slit 12 remains closed when no pressure differential exists, or when pressure inside is higher than pressure outside, in order to prevent liquid from leaking out. A plurality of such check valves may be provided.

Figure 2:
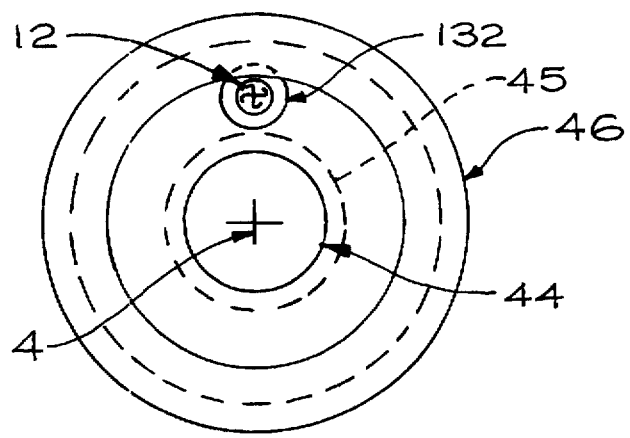
FIG. 2 is a top view, in an horizontal section, of an animal nipple for feeding animals, in accordance with this invention.

As shown in FIG. 2, the check valve slit 12 in the illustrating example is in the shape of a stylized letter X, but said slit 12 may be otherwise shaped in other manners which include, but are not limited to, an I-shaped slit, a Y-shaped slit or an X-shaped slit.

The check valve 11 may utilize other means for regulating the unidirectional flow of air into the container and preventing feed from leaking out. Such means include, by way of illustration only, the use of a flapper valve or a duck-bill valve in place of the annulus 132, cap 25 and slit 12.

Although the present illustration presents the outer surface of the animal nipple and/or cover to be smooth, the traverse wall 5, the side wall 15, or both, may optionally be formed in such a manner so as to contain a roughening means for ease in handling. Such means would be integrally molded into the traverse wall external face, and/or the outer face of the side wall 17 in the usual way. These means may include patterns or ridges cast into either face, or may be formed of accurately arranged groups of letters and/or words that are raised above the appropriate face of either wall. These groups of letters and or words may comprise indicia relating to the name of the manufacturer, his location or a trademark. Thus the means comprises a multiplicity of sharply defined projections that constitute roughening that facilitates the fastening and removal of the nipple/cover to the container.

With reference to FIG. 1, illustrative dimensions for a preferred nipple/cover, made of natural rubber and suitable for a bovine calf, are as follows. All dimensions stated here are approximate. All radii of curvature (hereinafter "RC"), as well as thicknesses and lengths, are in centimeters. The cap 43 of nipple 1 has both an inner surface 51 and an outer surface 53. The inner surface 51 of the cap 43 has a RC of 0.980, and the outer surface 53 of the cap 43 has a RC of 1.240. The second cap 25 has an inner surface 84 with an RC of 0.318 and an outer surface 86 with an RC of 0.198. The overall length of nipple 1 from the bottom 152 to the apex of the cap 43 (where the axis 49 intersects outer surface 53) is 10.236. The outer radius of the nipple tube 3 from the axis 49 is 1.266. Thickness of the material forming the nipple 1 varies along the length of the nipple.

The thicknesses for the following sections of the nipple 1 are as follows: thickness of the wall 44 is 0.254; thickness of the second cap 25 is 0.079; distance of the point of the inner face 19 that is furthest from the outer face 17 is 0.871.

The length of the side wall 15, from the bottom 152 to the apex of second cap 25 (where axis 131 intersects inner surface 84) is 2.151 and the distance from the bottom 152 to the point where inner perimeter 45 intersects the outside surface of wall 44 is 3.700.

With reference to FIG. 2, the diameter of the aperture 4 is 0.635 and the diameter of the slit 12 is 0.381.

The depth of the vent 13, along axis 131, measured from the intersection of the axis 131 with the outer face 47 of the traverse wall 5 to the intersection of axis 131 with the outer surface 86, is 0.901.

Those of skill will readily understand how to adjust dimensions from those indicated in FIG. 1 and inferred in the remaining figures to make a nipple cover suitable for domesticated mammals other than bovine calves or from materials other than natural rubber.

Figure 4A:
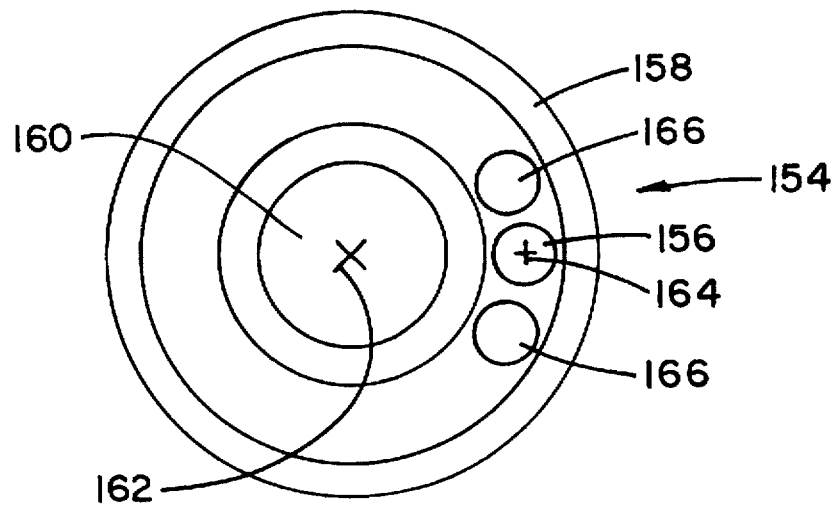
FIGS. 4A and 4B are bottom views of container covers, as can be used for animal feeding nipples, showing intervention members, in accordance with this invention.
Figure 4B:
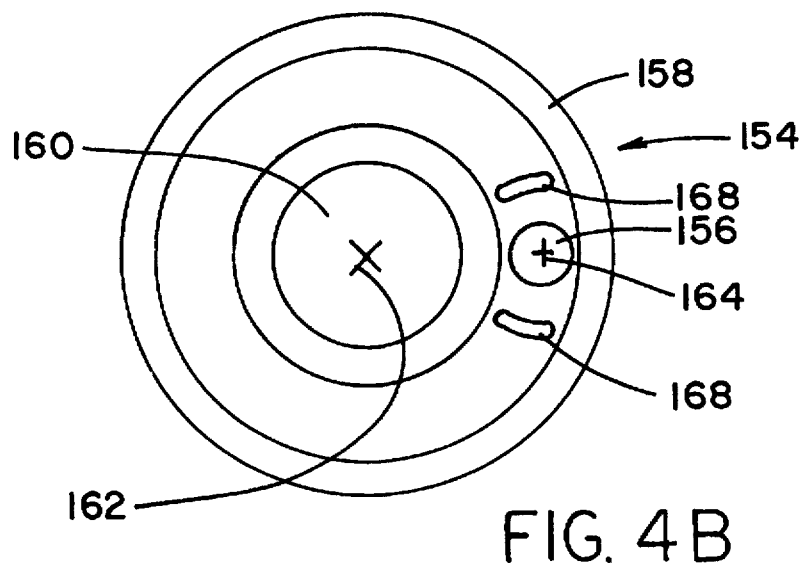

As best shown in FIGS. 4A and 4B, the nipple/cover 154 of this invention is intregal with check valve 156 for equalization of a pressure differential created by application of negative pressure to projection 160 and movement of fluid thereby through slit 162. As shown in FIGS. 4A and 4B, check valve 156 is located near edge 158 which can be, for purposes of attachment to a container, either a side wall or a peripheral edge. Intervention members 166 (FIG. 4A) or 168 (FIG. 4B) are spaced about check valve 156 to protect the valve from contact with a container used in combination therewith.

As best shown in FIG. 5, cover/nipple 154 can be used with an attachment member 174 comprising an overlaid rim in threaded engagement with container 176. Threaded engagement of member 174 with container 176 secures peripheral edge 172 and sealingly engages nipple/cover 154 to container 176. As shown schematically in FIG. 5, intervention member 166 is positioned between the edge of container 176 and check valve 156, in such a way as to protect the coordinated function of vent 170 and slit 164 upon unit directional flow of air into the container upon application of a negative pressure to the orifice, protuberance, or projection of nipple/cover 154.

As indicated above, those individuals skilled in the art and made aware of this invention will possess the requisite knowledge necessary to engineer and construct a nipple/cover in accordance with this invention. In particular, such knowledge will permit construction of a check valve and/or intervention members intregal with any such nipple/cover. Material choice, dimensions and configurations will be chosen to permit function of the check valve and/or nipple opening under minimum negative pressures applied to the nipple, orifice, or projection, such as those created upon the sucking action of an infant mammal. Likewise, the same and similar considerations will be applied to ensure proper function and operation of the check valve of this invention in response to application of such negative pressures.

While the principles of this invention have been described in connection with specific embodiments, it should be understood clearly that these descriptions, along with the presented figures, are made only by way of example and are not intended to limit the scope of this invention, in any manner. For instance, the check valve and/or vented control member of this invention can be used in combination with any suitably configured bottle, container, and the like, such container having a design suitable for withstanding repeated use and to ensure requisite sanitary conditions—especially so in the animal feeding context. Likewise, notwithstanding the various preferred and/or approximate dimensions provided herein, any such slit used in conjunction with a vented control member and/or check valve of this invention will be dimensioned and configured to perform optimally over the range of pressures contemplated. Other advantages and features of this invention will become apparent from the following claims, with the scope thereof determined by the reasonable equivalents, as understood by those skilled in the art.

What is claimed is:

1. In a nipple for feeding liquids to a domesticated mammal, the nipple comprising an elastic molded body and having:

a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal, a traverse wall having an inner perimeter and an outer perimeter and having an external face and an internal face, the external face being on the side of the nipple not exposed to liquid feed and the internal face being on the side of the nipple exposed to liquid feed when the nipple is used, a vent located between the inner perimeter and the outer perimeter of the traverse wall and having a check valve at the end of the vent, and a means for attaching the nipple to a container for liquid feed for the mammal, the improvement comprising an intervention member circumferentially spaced about the check valve to protect the check valve from contact with the container.

2. The improvement of claim 1 wherein the length between the distal end and the proximate end of the nipple tube and the thickness of the wall of the nipple tube render the nipple suitable for suckling by bovine calves.

3. The improvement of claim 2 wherein the nipple is made of natural rubber.

4. The improvement of claim 1 wherein said intervention member is at least one protrusion from the internal face of the traverse wall.

5. The improvement of claim 4 wherein the intervention member is a pair of beads diametrically opposed across said check valve.

6. In a nipple for feeding liquids to a domesticated mammal, the nipple comprising and elastic molded body and having:

a nipple tube having a distal end and a proximate end, a length between the distal end and the proximate end and a wall with a thickness that are suitable for suckling by the mammal, and having proximate its distal end a self-sealing aperture through which liquid flows from inside the nipple tube into the mammal in response to suckling by the mammal, a traverse wall having an inner perimeter and an outer perimeter and having an external face and an internal face, the external face being on the side of the nipple not exposed to liquid feed and the internal face being on the side of the nipple exposed to liquid feed when the nipple is used, a vent located between the inner perimeter and the outer perimeter of the traverse wall and having a check valve at the end of the vent, and a means for attaching the nipple to a container for liquid feed for the mammal, wherein the means for attaching the nipple to the receptacle comprises a side wall having a top, a bottom, an outer face extending from the top to the bottom, and an inner face extending from the top to the bottom, the top of the outer face of the side wall being contiguously joined to the outer circumference of the external face of the traverse wall, and the top of the inner face of the side wall traverse wall, the improvement comprising an intervention member circumferentially spaced about the check valve to protect the check valve from contact with the container.

7. The improvement of claim 6 wherein the length between the distal end and the proximate end of the nipple tube and the thickness of the wall of the nipple tube render the nipple suitable for suckling by bovine calves.

8. The improvement of claim 7 wherein the nipple is made of natural rubber.

9. The improvement of claim 6 wherein the inner face is configured for threaded engagement with the container.

10. The improvement of claim 6 wherein said intervention member is at least one protrusion from the internal face of the traverse wall.

11. The improvement of claim 10 wherein the intervention member is a pair of beads diametrically opposed across said check valve.

\* \* \* \* \*

UNITED STATES PATENT AND TRADEMARK OFFICE
CERTIFICATE OF CORRECTION

PATENT NO. : 5,784,999
DATED : July 28, 1998
INVENTOR(S) : Larson, et al.

It is certified that error appears in the above-identified patent and that said Letters Patent is hereby corrected as shown below:

(Col. 8, Line 46):
Omit "and" and insert --an--;

(Col. 9, Line 6):
After the words "of the side wall" insert --being contiguously joined to the outer circumference of the internal face of the--.

Signed and Sealed this

Ninth Day of November, 1999

*Attest:*

Q. TODD DICKINSON

*Attesting Officer*  *Acting Commissioner of Patents and Trademarks*